(No Model.) 4 Sheets—Sheet 1.
E. BARIQUAND.
ANIMAL SHEARS.
No. 400,036. Patented Mar. 26, 1889.
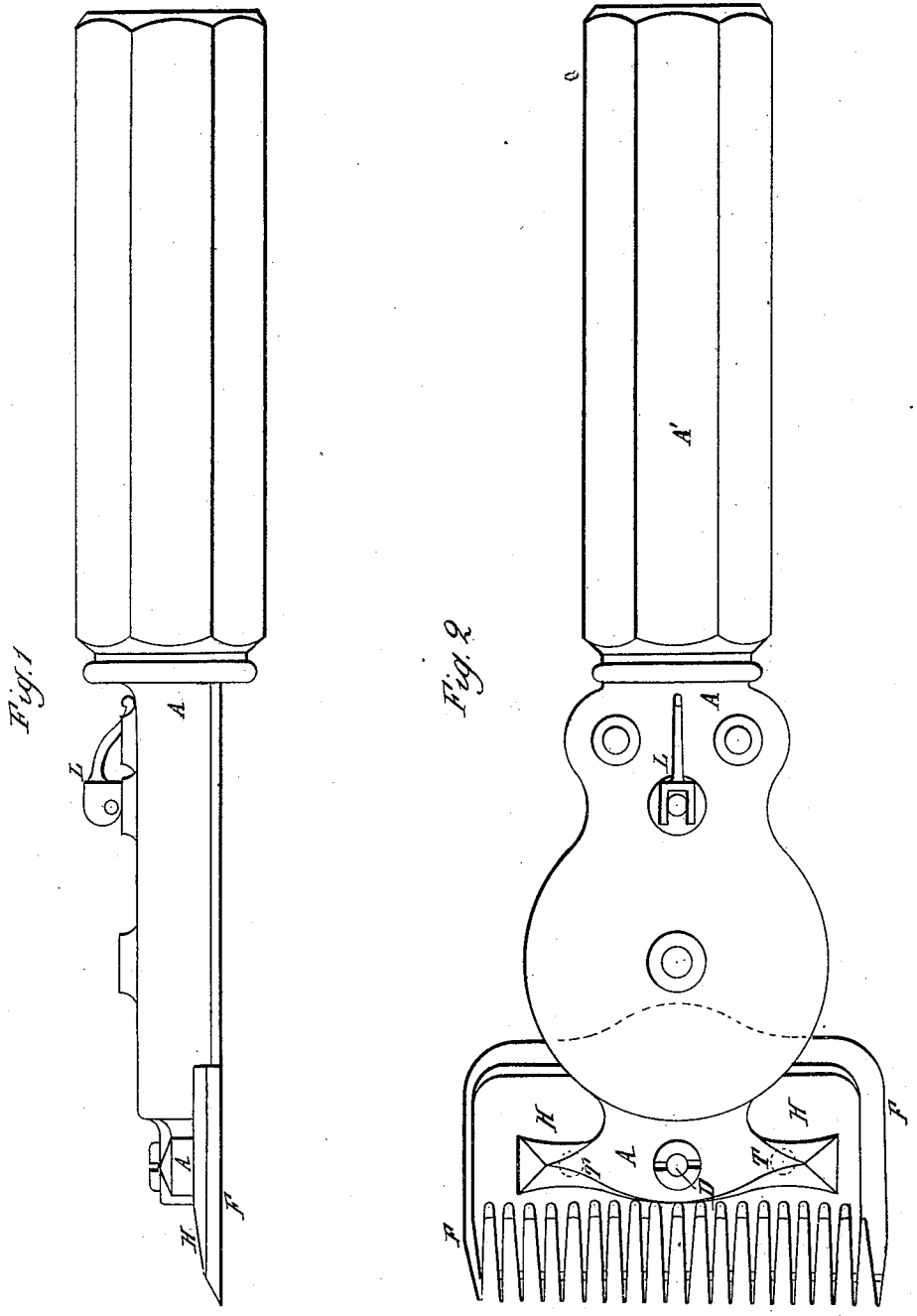
Witnesses:
J. A. C. Criswell.
George Dixon.
Inventor:
Emile Bariquand,
By his Attorneys,
Arthur C. Fraser & Co.

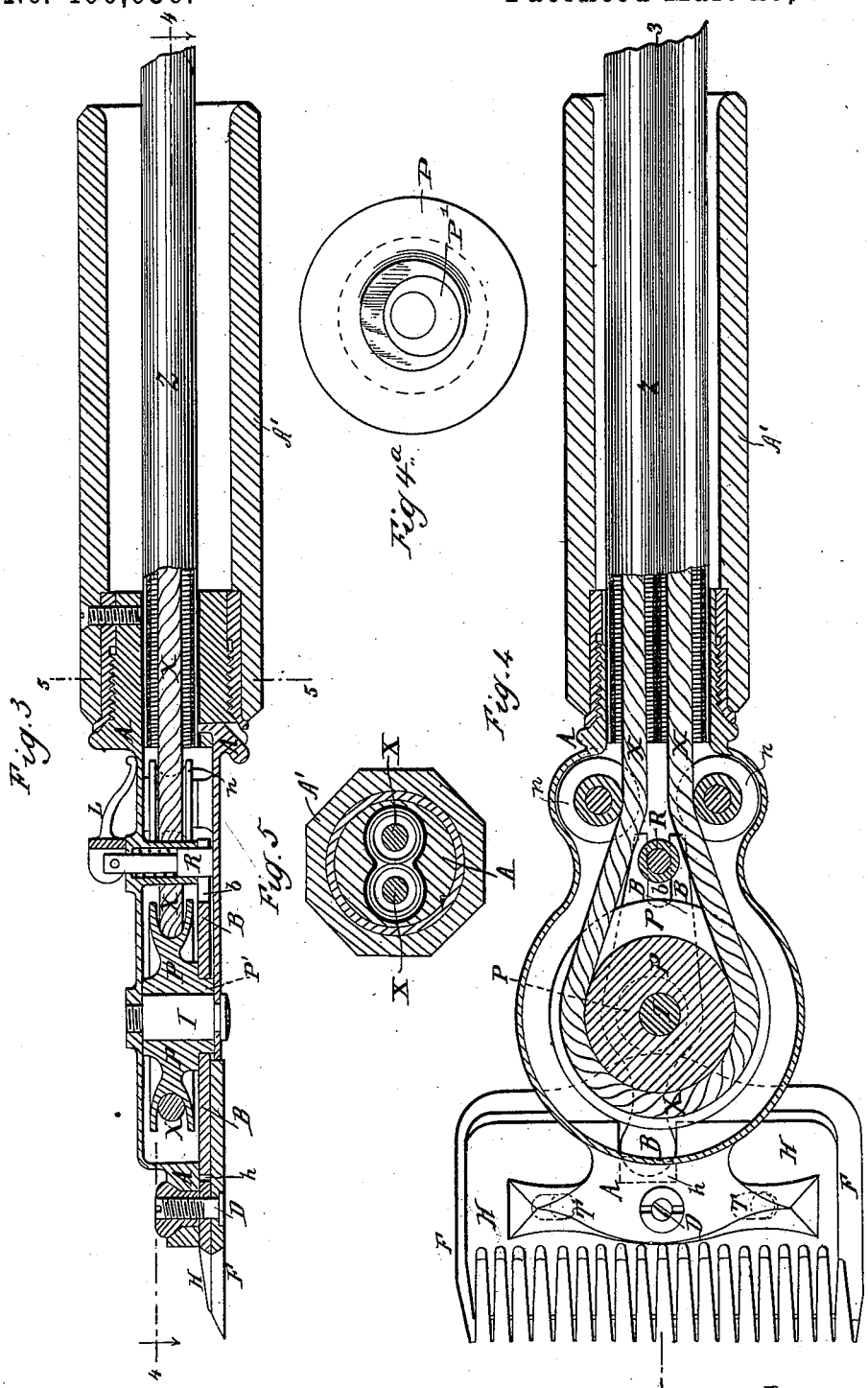

(No Model.) 4 Sheets—Sheet 3.
E. BARIQUAND.
ANIMAL SHEARS.
No. 400,036. Patented Mar. 26, 1889.
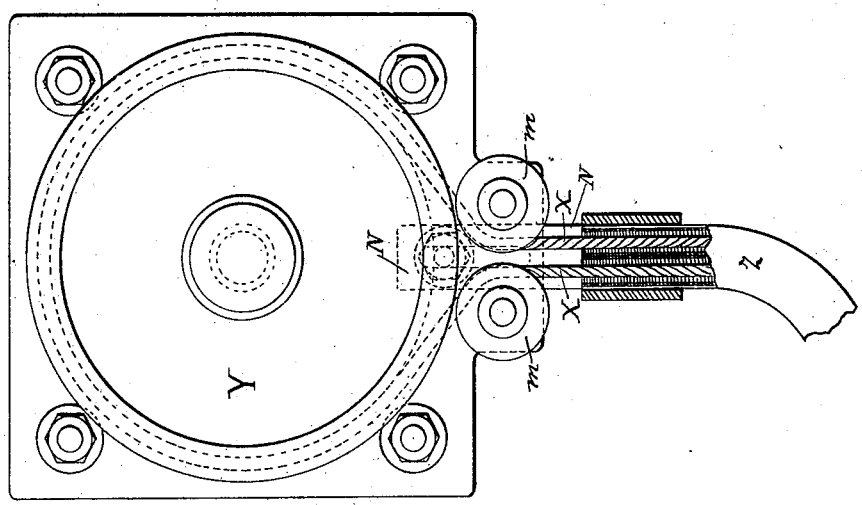
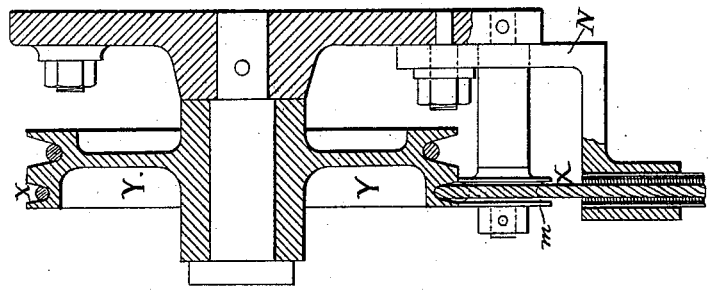
Witnesses:
Inventor:
Émile Bariquand,
By his Attorneys, (No Model.) 4 Sheets—Sheet 4.
E. BARIQUAND.
ANIMAL SHEARS.
No. 400,036. Patented Mar. 26, 1889.
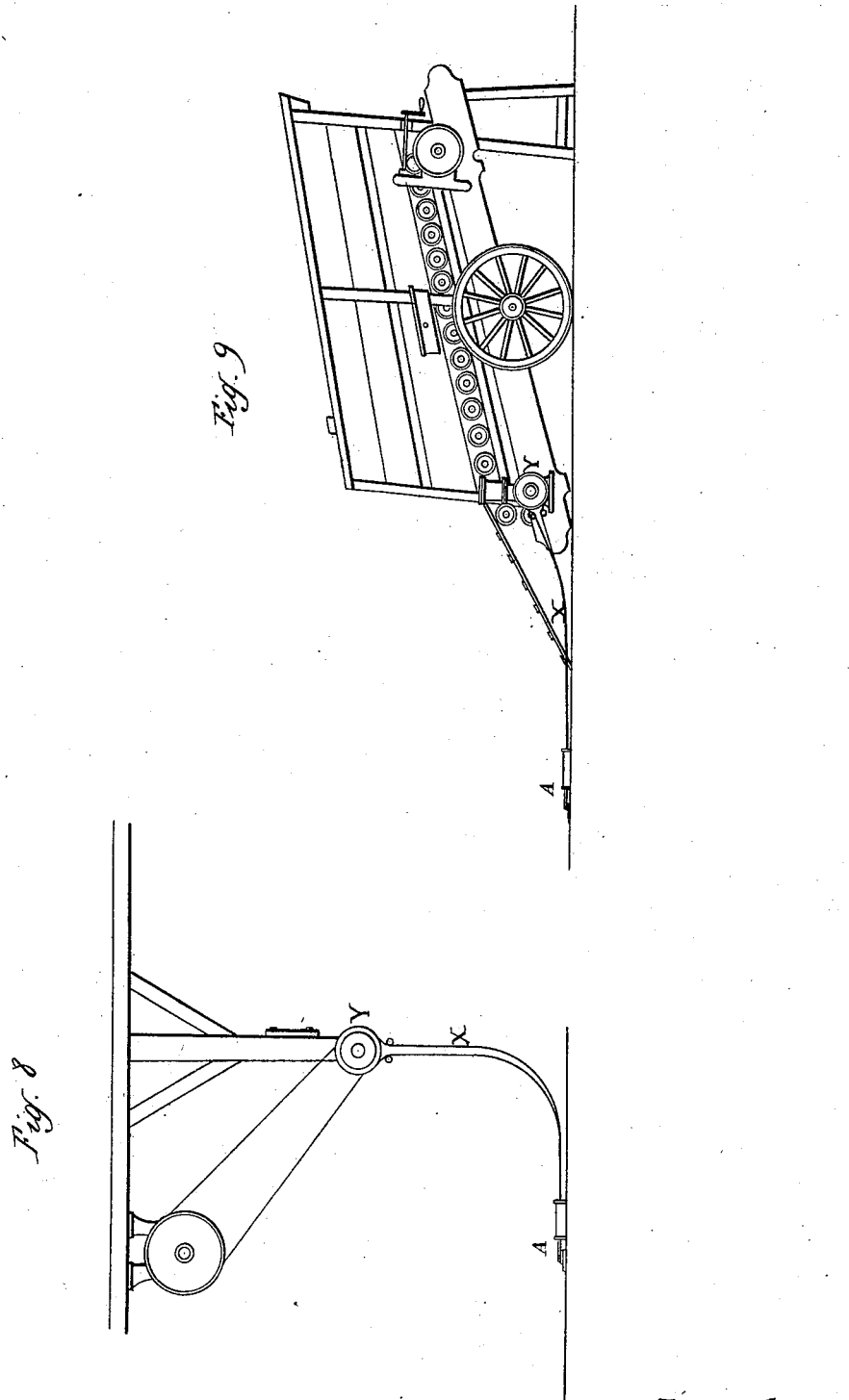
Witnesses.
J.A.O.Criswell.
George Dixon.
Inventor:
Émile Bariquand,
By his Attorneys,
Arthur E. Fraser & Co.

UNITED STATES PATENT OFFICE.

EMILE BARIQUAND, OF PARIS, FRANCE, ASSIGNOR TO THE SOCIÉTÉ BARIQUAND ET FILS, OF SAME PLACE.

ANIMAL-SHEARS.

SPECIFICATION forming part of Letters Patent No. 400,036, dated March 26, 1889.

Application filed September 29, 1888. Serial No. 286,714. (No model.)

*To all whom it may concern:*

Be it known that I, EMILE BARIQUAND, a citizen of the French Republic, residing in Paris, France, have invented certain new and useful Improvements in Shearing-Machines, of which the following is a specification.

The object of this invention is the mechanical operation of shearing-machines such as are held in the hand, of the kind which do not require the handles to be moved toward and from each other, the movement of the movable shear-blade or counter-comb over the fixed blade or comb being produced mechanically, the fixed lever becoming the body of the shearing-machine and the movable lever receiving mechanically the movement which gives the to-and-fro motion to the counter-comb.

According to my invention the shearing-machine is driven by a cord or band carried through a flexible tube or cable, motion being imparted to this band by a pulley driven by any suitable motive power.

The apparatus is shown in the accompanying drawings, wherein—

Figure 1 is a side elevation of the shearing-machine. Fig. 2 is a plan thereof. Fig. 3 is a vertical section thereof on the line 3 3 in Fig. 4. Fig. 4 is a horizontal section on the line 4 4 in Fig. 3. Fig. 4ª is an inverted plan of the eccentric-bossed pulley P. Fig. 5 is a transverse section on the line 5 5 in Fig. 3. Fig. 6 is a vertical transverse section of the motor-pulley for driving the shearing-machine. Fig. 7 is a front elevation of this pulley. Fig. 8 is an elevation of the entire apparatus adapted to a workshop. Fig. 9 is an elevation of the entire apparatus adapted for use in the field, where a horse-power is the motor.

I will first describe the construction of the hand shearing-machine, referring to Figs. 1 to 5.

The fixed part A constitutes the body of the instrument, and is fixed to the end of a handle, A', which the operator holds in his hand. The movable lever B vibrates about a pivotal axis or pin, R. The comb or fixed blade F supports the counter-comb or movable blade H, which is guided by the pins T T entering slots in the counter-comb. D is the adjusting-screw.

The movable lever B of the shearing-machine may be actuated in various ways, of which the preferable one is by means of a cord or belt. As seen in the drawings, a cord, X, or any flexible connector, is arranged in the form of an endless belt and passes around in the groove of a pulley, P, which turns on a pin, I, fixed to the body of the shearing-machine. This pulley P has an eccentric, P', formed on its hub, which engages the movable lever B, and at each turn imparts a complete oscillation or vibration thereto. The lever is thus a lever of the third class. The movable lever is preferably constructed with a circular opening, which receives the eccentric boss, so that the lever is oscillated thereby. The free end of the lever enters a notch or slot, $h$, in the movable comb H, while its opposite end has a slot, $b$, which embraces the pin R. The opposite portion of the cord X passes around in the groove of a pulley, Y, of the motor. (Shown in Figs. 6 and 7.) The whole apparatus is shown in Fig. 8. The portions of cord between the driving and driven pulleys Y and P are drawn toward each other by passing between pairs of sheaves $m\,m$ and $n\,n$, adjacent to the respective pulleys. Between the motor-pulley Y and the shearing-machine this cord is guided in a flexible tube or cable, Z, fixed at one end to the shearing-machine and at the other end in a piece, N, fixed to the motor. This flexible tube which incloses the cord is formed of two tubular helices of spring-wire in contact with one another. The cord passes to the shearing-machine through one of these tubes and leaves it by the other. The two tubes are held together by a succession of fastenings or bonds at intervals, or preferably by a continuous envelope of leather or textile fabric, as shown. This arrangement, which isolates the portion of cord passing in one direction from the portion returning, is the best, but is not indispensable. My system might act the same if the two portions of the cord were to pass through only one flexible tube made of a spiral spring or of a succession of short tubes jointed together or of any envelope whatever. In this mode of transmission the motor is, as shown, a grooved pulley, Y, which is driven by any suitable mechanical means, and over which passes the cord which transmits this rotary movement along the flexible tube to the pulley P of the shearing-machine, which actuates the movable lever B.

It is essential that the tube or cable Z shall be of such construction as to be sufficiently incompressible in longitudinal direction to enable it to act as a means of maintaining the belt taut, which it does by holding the driving-pulley Y and the driven pulley P at a fixed distance apart, this distance being measured not in a straight line, but along the curve of the tube. The tube may in use be curved in any direction after the manner of what is known as a "flexible shaft."

The end of the flexible tube which is fastened to the side of the motor is adjusted by a slotted piece, N, which serves to stretch the cord, and which thus insures that the pulley of the shearing-machine shall participate in the rotation, while at the same time keeping the tube flexible.

It may be remarked that although I have employed in my system of transmission a cord which is displaced by a continuous movement, nevertheless the arrangement is applicable as well to a cord which has an alternating movement. Thus the movable lever of the shearing-machine might receive its movement from an oscillating lever pivoted in the body of the shearing-machine, and this oscillating lever might be connected by two lengths of cord passing each one in a flexible tube to the ends of another oscillating lever, which would be the motor. Thus the same to-and-fro motion of the counter-comb would be secured; but the employment of continuous rotation as first described is more practical.

It is useful to be able to arrest instantly the movement of the counter-comb of the shearing-machine. This result may be attained by lifting up the fixed pin R, around which the lever B turns, for which purpose a latch, L, is provided. When this latch is thrown over, and the pin R consequently lifted, the continuing rotation of the pulley P no longer works the counter-comb, since the lever B is thrown out of engagement by having nothing to react against.

The shearing of animals, and particularly of sheep in large flocks, may be done in two ways. The flocks may be led into a workshop provided with motive power, mechanical transmission, &c.; or the operator may go and shear the flocks in the middle of the field where they are grazing.

In the first case the means for transmission shown in Fig. 8 may be advantageously employed. The motor is mounted at the height of a man on the lower end of a wooden beam fastened to the framing which supports the power-shaft of the shop. In this position the transmission of power from the motor to the shearing-machine is completely free. The animal to be sheared being on the ground, the numerous abrupt bends in the transmitting-cable which would otherwise occur are thus avoided. This arrangement permits the employment of an unlimited number of shearing-machines arranged in a series the length of the driving-shaft.

For shearing in the field, the shearing-machines may be driven by means of an inclined-plane horse-power, as shown in Fig. 9. This horse-power should be mounted on a special carriage, so as to be easily transportable and always ready to be set in motion.

I claim as my invention the following-defined novel features, substantially as hereinbefore specified, namely:

1. The combination, with a hand shearing-machine having a pulley for driving its movable comb, of a motor having a driving-pulley, an endless cord or belt for transmitting motion from the motor-pulley to the shearing-machine pulley, and a flexible tube or cable extending from one of said pulleys to the other, inclosing the portion of the belt between them, and constructed to resist longitudinal compression between them and serve to hold the pulleys spaced apart and keep the belt taut.

2. The combination, with a hand shearing-machine and a motor, of a flexible tube or cable extending from the one to the other and constructed with two separate tubular conduits, and a cord or belt receiving motion from the motor and transmitting it to the movable comb of the shearing-machine, the one part of said cord passing through one of said conduits and the other part through the other conduit, whereby the portions of the cord moving in opposite directions are separated.

3. A shearing-machine consisting of a handle, a fixed blade or comb, a movable comb mounted to slide against the fixed comb, a rotary pulley having an eccentric boss, a movable lever of the third class having an opening receiving said eccentric boss, connecting at its free end with the movable comb, and slotted at its other end, and a stationary pivot-pin entering said slotted end, whereby the lever oscillates with said eccentric boss and vibrates about said stationary pin.

4. A shearing-machine consisting of a handle, a fixed blade or comb, a movable comb mounted to slide against the fixed comb, a rotary pulley having an eccentric boss, a slotted movable lever arranged to be vibrated by contact with said eccentric boss, connecting at its free end with the movable comb, and a stationary pivot-pin entering the slot in said lever, whereby the lever vibrates about said stationary pin, and a latch for moving said pin out of engagement with the lever, whereby the latter is thrown out of gear and the movable comb is no longer driven.

In witness whereof I have hereunto signed my name in the presence of two subscribing witnesses.

EMILE BARIQUAND.

Witnesses:
R. J. PRESTON,
ARMENGAUD, Jeune.